United States Patent Office 3,506,730
Patented Apr. 14, 1970

3,506,730
ISOMERIZATION OF ALKYL AROMATIC
HYDROCARBONS
James Salvatore Marchese, North Plainfield, N.J., and James Chipman Hamilton, Cincinnati, Ohio, assignors to American Cyanamid Company, Stamford, Conn., a corporation of Maine
No Drawing. Continuation-in-part of application Ser. No. 586,389, Oct. 13, 1966. This application July 8, 1968, Ser. No. 743,022
Int. Cl. C07c 5/30; 15/24
U.S. Cl. 260—668                    7 Claims

ABSTRACT OF THE DISCLOSURE 1,2- and 1,4-diisopropyl benzenes are isomerized to 1,3-isopropyl benzenes and 1-isopropyl naphthalenes are isomerized to 2-isopropyl naphthalenes in the presence of a boron trifluoride-phosphoric adduct as catalyst.

---

This application is a continuation-in-part of our copending application, Ser. No. 586,389, filed Oct. 13, 1966, and now abandoned.

This invention relates to a process for the isomerization of alkylated aromatic hydrocarbons. More particularly, it relates to a process for the isomerization of 1-alkylated naphthalenes to 2-alkylated naphthalenes and to the isomerization of 1,2- and 1,4-dialkylated benzenes to 1,3-dialkylated benzenes.

Synthesis of mono- or polyalkylated aromatic hydrocarbons by the Friedel-Crafts reaction or modifications thereof are well known. Certain other preparative methods have been employed or suggested. Regardless of the specific preparative method, however, the product obtained, in most cases, is an isomeric mixture, with the specific isomer produced in major amount being dependent to some extent upon the specific preparative method employed. Thus, even though a particular preparative method may yield predominantly one isomer, other isomers are generally present in significant amounts. For certain purposes, isomeric mixtures are satisfactory. For other purposes, even the presence of modest proportions of certain isomers renders the isomeric mixture unsuitable for effective use.

In some cases, isomeric mixtures are readily separated because of differences in physical properties of the individual isomers, by distillation, fractional crystallization, solubility differences, etc. In other cases, the isomers have very closely related physical properties and are not capable of separation except by very tedious and time-consuming procedures which require elaborate and expensive equipment and which are impractical for all but very small quantities of product. Particularly, this is true of the 1- and 2-alkyl isomers of naphthalene.

Depending upon the subsequent use of the alkylated aromatic hydrocarbons, the specific isomer of the compound which predominates may be of utmost significance. Where, for example, an alkyl naphthalene is to be converted to beta-naphthol by subsequent oxidation and acidification of the oxidized intermediate, it is important that the intermediate be predominantly beta-isomer in order to ensure the best possible yields of the desired product.

In view of the difficulties of resolving isomeric mixtures of alkylated aromatic hydrocarbons, the difficulties of oxidizing isomeric mixtures thereof which contain significant quantities of an interfering isomer and the problems associated with known isomerization processes, there exists the need for an improved isomerization process and/or a process whereby the content of a specific isomer in an isomeric mixture can be substantially enriched at the expense of the other isomers. It is the object of this invention to provide a process which fulfills these needs. Other objects will be apparent hereinafter.

It has now been discovered that an isomeric mixture of alkylated aromatic hydrocarbons, particularly diisopropyl benzenes and mono- and di-isopropyl naphthalenes can be enriched in one specific isomer by contacting such mixture with at least 1% or more, based on the weight of the hydrocarbon mixture, of boron trifluoride-phosphoric acid adduct for a sufficient time period. In the case of isopropyl benzenes the meta-isomer is enriched, while in the case of the isopropyl naphthalenes the 2-isopropyl isomer is enriched. Enrichment can be achieved to a surprising extent, i.e., 95% and higher.

According to the present invention, the isomeric mixture to be enriched is contacted with a suitable amount of boron trifluoride-phosphoric acid adduct at any convenient temperature.

As afore-indicated, the process of the invention is particularly applicable to the isomerization of diisopropyl benzenes and mono- and di-isopropyl naphthalenes. Thus, 1,2- and 1,4-diisopropyl benzenes are converted in the process to 1,3 diisopropyl benzenes, while 1-isopropyl naphthalenes, including diisopropyl naphthalenes having one isopropyl group in the 1-position (on the naphthalene ring) and a second isopropyl group in a position other than the 2- or 3-position are converted to 2-isopropyl naphthalenes. Specifically, 1-isopropyl naphthalene is converted in the process to 2-isopropyl naphthalene, 1,4-diisopropyl naphthalene is converted to 2,4-diisopropyl naphthalene; 1,5-diisopropyl naphthalene and 1,6-diisopropyl naphthalene are converted to 2,6-diisopropyl naphthalene; and, 1,7-diisopropyl naphthalene and 1,8-diisopropyl naphthalene are converted to 2,7-diisopropyl naphthalene.

It will be appreciated that while the process of the invention is designed particularly for effecting the aforesaid conversions in isomer mixtures containing varying amounts of the desired isomer, whereby the content of the latter in the mixture is enriched, it will still effect the conversions in the absence of the desired isomer. Thus, the process is in fact a new and improved process for carrying out the said isomerizations, whereby high yields of the desired isomers are obtained with substantially no disproportionation taking place, particularly in the isomerization of the 1-isopropyl naphthalene.

In conducting the isomerization process, a solvent may be present if desired. Where present, the solvent should be used at an amount that will dissolve the alkylated aromatic hydrocarbons at the temperature employed in the process. The temperature of the process may vary widely without affecting the enrichment obtained. Thus, the temperature may vary from about −20° C. to about 100° C. or higher, if desired. It is preferred to conduct the isomerization at about 0 to 80° C., with the nature of the isomeric mixture being the primary determinant of temperature preference. Where the isomeric mixture contains solid materials, the isomerization temperature is generally at or above the melting point of the solid materials unless solvent is employed to give a solution at the isomerization temperature. Suitable solvents are those which dissolve alkylated aromatic hydrocarbons and do not interfere in the isomerization. Such solvents include halogenated hydrocarbons such as carbon tetrachloride.

The catalyst employed in the isomerization process is an adduct of boron trifluoride and phosphoric acid. This is prepared by adding boron trifluoride to phosphoric acid. It is preferred to us econcentrated phosphoric acid but some water may be present and additions of phosphorus pentoxide may be made to reduce the water content where necessary. At least an equimolar amount of boron trifluoride is preferably added to the phosphoric acid. In some cases excesses of boron trifluoride may be present due to its solubility in phosphoric acid without adverse effect on the catalyst. The amount of adduct employed in the isomerization process may vary widely but will generally be in excess of 1% based on the weight of the alkylated aromatic hydrocarbons present. The upper limit of the adduct usage may be as high as 100% or more on the same basis, depending upon its availability and the time in which it is desired to complete the isomerization. Thus, using 10% of adduct, the time required may be as high as 8 hours or more, while with 70% of the adduct, the time may be reduced to one hour or less. Conveniently, about 20% of adduct effects the isomerization process in about 4–6 hours.

During the isomerization process, agitation is maintained. After the desired time of processing, agitation is stopped and the desired isomeric mixture or solution separates from the catalyst. The upper layer, which is the desired product, is drawn off and separated from solvent, if necessary. The lower layer, which is the boron trifluoride-phosphoric acid adduct, is used for subsequent isomerizations, in the same vessel, if desired. While it normally is not necessary to regenerate the adduct in any way for subsequent recycles, occasionally, especially after numerous cycles, it is preferred to add slight amounts of boron trifluoride to maintain the proper molar ratio with phosphoric acid, since some losses thereof may occur, especially during high temperature isomerizations.

In addition to the use of alkylated aromatic hydrocarbons as intermediates for the formation of phenols, they constitute suitable materials for various industrial chemical purposes such as aviation gasoline additives, synthetic rubber intermediates, intermediates for various plastics, oxidation to hydroperoxides for use as polymerization catalysts or further syntheses, sulfonation for production of synthetic detergents and the like.

The invention is illustrated by the examples which follow.

EXAMPLE 1

Into a suitable reactor are placed 173 g. of 85% phosphoric acid. To the acid are added 101 g. of boron trifluoride with agitation. The boron trifluoride is passed in as a gas at the rate at which it is readily absorbed by the acid, about 15 minutes being required. To this mixture are then added 255 g. of isopropylnaphthalene containing 64.4% of betaisomer and the reaction mixture is heated to 50° C. After 1 hour of reaction at this temperature, the product is separated from the catalyst and cooled. The product now contains 96% of beta-isomer.

This example represents a preferred embodiment of the present invention and the catalyst usage is 97% based on the weight of the isopropylnaphthalene.

EXAMPLE 2

Following the procedure of Example 1 a series of isomerization runs are made. The details are given in Table I which follows:

TABLE I

| Percent beta-isomer initially | Percent catalyst* | Reaction temp. C. | Time of reaction hrs. | Percent beta-isomer in final product |
|---|---|---|---|---|
| 50.5 | 3.0 | 80 | 6 | 68.2 |
| 50.5 | 3.0 | 50 | 6 | 64.5 |
| 66.5 | 48.0 | 0 | 5 | 80.2 |
| 82.3 | 48.0 | 50 | 5 | 96.1 |
| 83.2 | 97.0 | 25 | 1 | 97.0 |
| 50.5 | 46.5 | 50 | 1 | 80.0 |

*Based on the weight of isopropylnaphthalene.

The various runs in this example illustrate the effect of variations in the process upon the degree of isomerization achieved. From these runs and others of similar nature it is concluded that the isomerization process is little affected by temperature variations and that the degree of isomerization achieved is dependent upon the specific amount of catalyst employed and the time of reaction.

EXAMPLE 3

The procedure of Example 1 is followed except that 162 g. of p-diisopropylbenzene is substituted for the isopropylnaphthalene. There is obtained a product which contains 40% of m-diisopropylbenzene.

EXAMPLE 4

To 112 g. of the boron trifluoride-phosphoric acid adduct prepared as in Example 1 are added 170 g. of isopropylnaphthalene of 82% beta-isomer content and 400 g. of carbon tetrachloride. The isomerization is run at 50° C. for 6 hours. At the end of this time the product is separated from the catalyst and solvent and is found to contain 99.7% of monoalkylated naphthalene of which 96.2% is the beta-isomer.

This example shows that a solvent may be effectively used in the process of this invention and that essentially no disproportionation occurs during the isomerization.

EXAMPLE 5

1,6-diisopropylnaphthalene, 106 grams, 0.5 mole, was stirred for 3 days at 50–70° C. in the presence of a phosphoric acid-boron trifluoride adduct, prepared by passing 78.2 grams of boron trifluoride gas into 100 grams of phospholeum (103% phosphoric acid).

Analysis of the reaction mixture showed the following major components:

| | Percent |
|---|---|
| 2,6-diisopropylnaphthalene | 70 |
| 1,6-diisopropylnaphthalene | 6.93 |
| 2-isopropylnaphthalene | 9.95 |

This example illustrates the production of the 2,6-isomer from the 1,6-isomer in a ratio of about 10:1.

We claim:
1. A process for the isomerization of a compound selected from
   (a) 1-isopropyl naphthalene
   (b) 1,4-diisopropyl naphthalene
   (c) 1,5-diisopropyl naphthalene
   (d) 1,6-diisopropyl naphthalene
   (e) 1,7-diisopropyl naphthalene and
   (f) 1,8-diisopropyl naphthalene to produce therefrom, respectively,
   (a) 2-isopropyl naphthalene
   (b) 2,4-diisopropyl naphthalene
   (c) 2,6-diisopropyl naphthalene
   (d) 2,6-diisopropyl naphthalene
   (e) 2,7-diisopropyl naphthalene and
   (f) 2,7-diisopropyl naphthalene which comprises intimately contacting said compound with at least about 1% by weight of a boron trifluoride-phosphoric acid adduct for at least about 1 hour at a temperature of from about −20° C. to about 100° C.

2. The process of claim 1 wherein 1-isopropyl naphthalene is isomerized to 2-isopropyl naphthalene.

3. The process of claim 1 wherein 1,6-diisopropyl naphthalene is isomerized to 2,6-diisopropyl naphthalene.

4. The process of claim 1 wherein the starting material is a mixture comprised of the compound to be isomerized and the isomer to be produced in the process.

5. The process of claim 3 wherein the starting material is an isometric mixture of 1- and 2-isopropyl naphthalenes.

6. The process of claim 1 wherein the compound is contacted with from about 20% to about 70% by weight of the adduct.

7. The process of claim 1 wherein a solvent is employed.

References Cited

UNITED STATES PATENTS 2,762,750   9/1956   Slaughter et al.
2,849,509   4/1958   Slaughter et al. _____ 260—668

DELBERT E. GANTZ, Primary Examiner

C. R. DAVIS, Assistant Examiner

U.S. Cl. X.R.

260—672